T. KAJIYAMA.
GAME DEVICE.
APPLICATION FILED JUNE 26, 1916.

1,224,173.

Patented May 1, 1917.
2 SHEETS—SHEET 1.

Witness

Inventor
TAMEO KAJIYAMA

T. KAJIYAMA.
GAME DEVICE.
APPLICATION FILED JUNE 26, 1916.

1,224,173.

Patented May 1, 1917.
2 SHEETS—SHEET 2.

Inventor
TAMEO KAJIYAMA
By
Attorneys

UNITED STATES PATENT OFFICE.

TAMEO KAJIYAMA, OF NEW YORK, N. Y.

GAME DEVICE.

1,224,173.  Specification of Letters Patent.  Patented May 1, 1917.

Application filed June 26, 1916. Serial No. 106,003.

*To all whom it may concern:*

Be it known that I, TAMEO KAJIYAMA, a subject of the Emperor of Japan, residing at New York, in the county of New York and State of New York, have invented certain new and useful Improvements in Game Devices, of which the following is a specification.

This invention relates in general to amusement devices, and particularly, to a device for playing a new game entitled "Life."

The object of the invention is to produce a game and device for playing the same, especially one which will not require either skill or mental or physical exertion on the part of the participants.

A further object of the invention is to produce a new game which may be readily played and enjoyed by persons of all ages.

The accompanying drawings illustrate the preferred forms of devices with which the game is played.

In these drawings:—

Figure 1 is a plan view of a board form of device, having the necessary checkered surfaces for playing the game;

Figure 2:
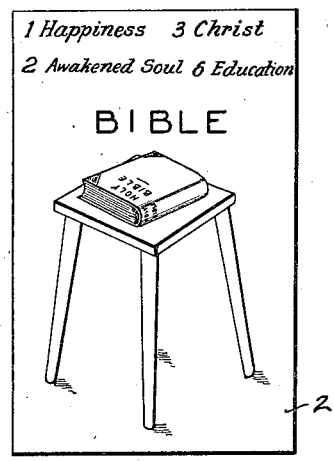
Figs. 2, 3, 4 and 5 illustrate a card form of device for playing the game.

The device illustrated in Fig. 1 may be produced in any desirable manner. The same may be constructed of wood with the checkered surfaces inlaid with strips of different material, or wood of different color or grain; if desirable cardboard may be employed. The device referred to as the card form may be constructed of cardboard or thin blocks of wood.

The game may be participated in by any number of players, each player having a movable man or piece with which to designate his position on the board. An ordinary dice or some similar device is also employed and used by the players to direct the course which their movable men must take over the board.

As heretofore stated, the game is entitled "Life," and represents many different positions and circumstances in real life. The object to achieve in winning the game is one which is desired to be accomplished in life, namely, success. To occupy the goal and win the game, each player must necessarily start from the beginning and occupy different positions on the board which represent different conditions. For instance, a player may start and progress very rapidly toward the goal, namely, success, but at any time, destiny may overtake him and he may be demoted and caused to occupy positions which are in direct contrast to the positions which are necessary to be occupied in achieving the goal. In some instances, a player may start and occupy positions which apparently lead to his being retired from the game, however, there is always a chance that another roll of the dice will put him in a position facilitating his chances of attaining the goal. When it falls to a player's lot to be completely removed or retired from the game, it will be necessary for him to wait until the other participants have finished the game.

In playing the game, each participant will begin in the space indicated by the numeral 1. This space represents or designates the "Palace of unborn souls." In this space several of the most important positions on the board are represented by the numerals 1 to 6. A player uses an ordinary dice having the usual six sides, and with the numerals 1 to 6 indicated on its six sides respectively. A player rolls the dice, and should the numeral 2 turn up on one of its sides, this would indicate "Wealth" and the player would have his movable man occupy that square of the checkered surface having the word "Wealth" written therein; in the present instance it would be the square 2. The next player would then take the dice and after rolling, should the numeral 4 turn up on one of its faces, he would have his man occupy that square on the checkered surface representing "Poverty"; in the present instance the square 3. The next player would then perform in a like manner and so on according to the number of participants in the game. In starting, should a player roll a dead number, in the present instance, number three, he will be compelled to await his next turn without going out. After each participant has played, the one first to play will again have the dice. When he now rolls, it is to be noted that this player by his first move now occupies the square 2 representing "Wealth," and should the numeral 3 turn up, he would move his man to that square on the checkered surface representing "Opportunity," as the numeral three in the square representing "Wealth" designates "Opportunity." Should he be so unlucky as to roll the numeral 5, which represents "Sickness" in the "Wealth" square, he would have to occupy the square representing "Sickness" and so on. The second player would then have the opportunity of rolling and he would move to the place represented by the name corresponding to the numeral he rolls. The game is won when a player succeeds in occupying the space or goal 3 which represents, in the present instance, "The palace of success."

It is to be noted that the name representing each square is closely allied to the names given the future play indicating numbers in its square. It, of course, lends added interest to the game, as for example, should a player occupy a square indicating "Education", his next move may lead him to "Knowledge", "Money", "Travel" or "Work" as the future play indicating numbers in the square representing "Education" represent the words "Knowledge", "Money", "Travel" and "Work". In some squares, a player, by rolling certain numbers may be caused to wait until the other participants have played a given number of times before he would be permitted to proceed in his regular turn. It may also happen that a player may roll a number which is not given in the square that he is occupying. In this case he would lose his play and be compelled to await his next turn.

Figure 3:
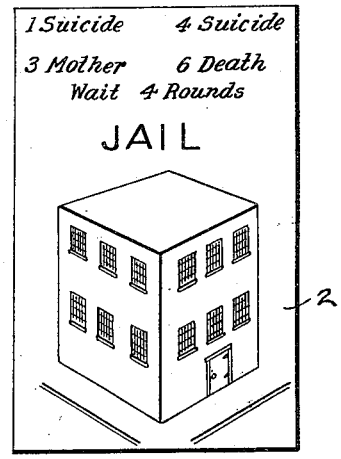
Figure 4:
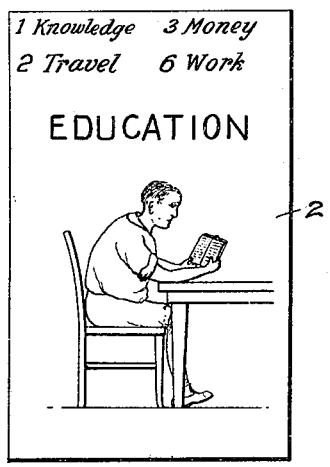
Figure 5:
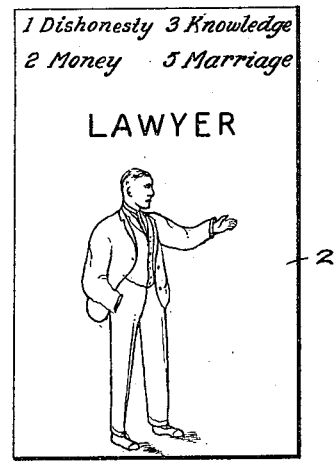
Figure 7:
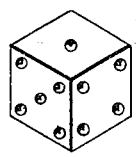
Fig. 7 is a perspective view of an ordinary dice which is used in playing the game.
Figure 6:
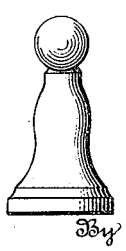
Fig. 6 is an elevation of a form of man or movable piece which is used in playing the game.

The card form of the device illustrated in Figs. 2 to 6 may be used in the same manner as the board form is used. In using the card form, each card will represent a square and they may be arranged in any desirable order to produce the necessary checkered playing surface. In producing the card form, the spaces offered by each card will enable a picture to be shown giving a pictorial representation of the character of the square. The manner of playing the game has been described with reference to a dice. Should it be desirable, any other device may be employed for this purpose, such for instance, as a spinning device, consisting of a hand revolubly mounted on a base which has a series of numbers arranged in a circle. In using this particular device, the hand would be spun or rapidly revolved, and the number on which the pointer end stopped would indicate the next move.

The characterized playing spaces or squares, as well as the future play indicating characters may be substituted with names other than those given, and the number of plays or squares may be added to or taken from without departing from the spirit of the invention, and it is therefore to be fully understood that such changes as these, as well as other minor changes will come under the purview of the subjoined claims.

I claim:—

1. A game device, comprising a playing surface divided into a multiplicity of characterized playing spaces, each of said spaces having future play indicating characters associated therewith, a starting space and a goal included in said playing surface, said starting space having a series of play indicating characters corresponding to some of said playing spaces, and play indicating means also provided with play indicating characters corresponding to both the future play indicating characters in the playing spaces, and the play indicating characters in the starting space.

2. A game device, comprising a playing surface divided into a multiplicity of characterized playing spaces, each of said spaces having future play indicating characters associated therewith, a starting space and a goal included in said playing surface, said starting space having a series of play indicating characters corresponding to some of said playing spaces, and play indicating means also provided with play indicating characters corresponding to both the future play indicating characters in the playing spaces, and the play indicating characters in the starting space, said play indicating means adapted to indicate and direct plays from the starting spaces and the characterized playing spaces.

3. A game device comprising a checkered playing surface divided into a multiplicity of characterized playing spaces, each of said spaces having future play indicating characters associated therewith, a characterized starting space and a characterized goal included in said playing surface, said starting space having a series of play indicating characters corresponding to some of said playing spaces, a movable playing piece, and play indicating means also provided with play indicating characters corresponding to both the future play indicating characters in the playing spaces, and the play indicating characters in the starting space, whereby said movable playing piece may be directed to occupy different characterized spaces in the playing surface.

4. A game device comprising a checkered playing surface divided into a multiplicity of playing spaces, a movable piece adapted to traverse said playing surface and occupy different ones of the playing spaces, a starting space and a goal, means for indicating the different positions of the movable piece with respect to the playing spaces, as well as the starting space and the goal, said playing spaces, starting space and goal being characterized to represent progress and destiny and other allied meanings, whereby the movable piece in occupying the different playing spaces will be confronted with conditions representing advancement and demotion, and thereby enabling it to reach either the goal or be removed from the active playing spaces.

The foregoing specification signed at Washington, District of Columbia, this 24th day of June, 1916.

TAMEO KAJIYAMA.

Copies of this patent may be obtained for five cents each, by addressing the "Commissioner of Patents, Washington, D. C."